Patented June 15, 1926.

1,588,691

UNITED STATES PATENT OFFICE.

HARRY P. BASSETT, OF CYNTHIANA, KENTUCKY, AND ELBERT C. LATHROP, OF PHILADELPHIA, PENNSYLVANIA.

METHOD OF MAKING ARSENATES.

No Drawing.  Application filed April 10, 1924. Serial No. 705,693.

This invention relates to methods of oxidizing arsenious oxide, arsenious acid, and its compounds, and more particularly to methods of oxidizing these materials in which chlorine is employed.

This invention is an improvement over the process disclosed in the copending application of Harry P. Bassett, filed February 19, 1923, Serial No. 620,050, for methods of making arsenates.

All of the arsenate in commerce today is produced by the oxidation of arsenious acid with concentrated nitric acid, the material produced being then neutralized with the desired base. A serious objection to this method is that nitric acid is not complete in its oxidizing power and is not even in its action. This often causes explosions, due to sudden reactions taking place. Nitric acid does not act evenly on arsenious oxide unless the oxide is of 99 per cent purity or better.

This causes a limit on the amount of arsenic available, and the lower arsenic containing compounds cannot be employed as a substitute therefor. The compounds of arsenious oxide, such as sodium and calcium arsenites, are not available for the production of arsenates when the nitric acid method is used.

Heretofore, it has been impossible to successfully and commercially produce arsenates by means of chlorine.

In the present invention, we provide a method by means of which the lower arsenic containing compounds, including the arsenites, may be oxidized by means of chlorine. The arsenious acid or one of its compounds is treated with chlorine or bleaching powder in the presence of an alkali metal salt or a metallic salt which agents seem to have a catalytic effect on the oxidation. A solution of white arsenic is first prepared and bleaching powder is added thereto in the theoretical amount, the reaction being permitted to take place in a closed vessel, giving the arsenious oxide time to react with the "chloride of lime" (calcium hypochlorite) present to form a mixture of mono-calcium arsenate and dicalcium arsenate. The arsenate is treated with enough lime to set the arsenic, and not form basic calcium chloride, forming a mixture of dicalcium arsenate and tricalcium arsenate which is insoluble. These arsenates are separated from the calcium chloride present by filtration, and sufficient of a salt of an alkali metal, capable of forming an insoluble calcium salt with the calcium cations of the arsenates is added, to precipitate all of the calcium, and leaving a soluble arsenate under proper conditions of temperature. In practice, we prefer to use sodium carbonate. The calcium carbonate or other salt of calcium is filtered off, and the sodium arsenates and other sodium salts which remain in the filtrate are digested with an insoluble lead compound, such as lead monoxide (litharge), capable of forming lead arsenate. This is filtered off, washed and dried. The filtrate and washing are evaporated back to volume. This liquor is carbonated by flue gases or other sources of carbon dioxide, and reused to form some impure sodium arsenates again.

The lead or sodium salts formed in the two above steps of this process may be the di or tri salts, but this matter of exact ratio of lead or sodium to the arsenates formed is not material to this invention. It is obvious that other arsenates, such as copper, may be prepared in a similar way.

In a typical embodiment of the invention, a solution or suspension of white arsenic or one of its compounds is first prepared and bleaching powder is added thereto in the theoretical amount. The mixture is placed in a closed vessel where any chlorine that is liberated is prevented from escaping, giving the arsenious oxide time to react with the lime and lime salts present. The reaction forms a mixture of mono-calcium and di-calcium arsenate along with the formation of calcium chloride, which acts as a catalyzer during the reaction.

If gaseous chlorine is used, some lime must be added to the mixture before the chlorine will react efficiently with the arsenious oxide. The mixture of mono-calcium and di-calcium arsenate resulting from the oxidation is dumped into an agitating tank and enough lime added to set the arsenic. By "setting" is meant the conversion of the mixture of mono-calcium arsenate and di-calcium arsenate to di-calcium arsenate and tri-calcium arsenate, which are insoluble.

During this part of the process, it is advisable to heat the solution to a temperature of substantially 60° C., which promotes the reaction. The slurry formed is then fed to a filter, and the arsenate filtered off and washed to remove the calcium chloride.

The press cake containing the insoluble calcium arsenates is then heated or boiled in water containing the requisite amount of soda ash to convert all the calcium to calcium carbonate, thus producing a mixture of sodium arsenates in solution.

To obtain the sodium arsenate, we either evaporate or concentrate this aqueous solution without special treatment, or else add sodium hydroxide to produce substantially tri-sodium arsenate.

The so-formed arsenate or sodium arsenates are digested with lead monoxide (litharge) in the preferred embodiment of our invention to produce lead arsenate. Insoluble lead arsenate and sodium hydroxide are formed. The insoluble lead arsenate is filtered and washed. The filtrate and washings contain sodium hydroxide and the excess sodium arsenate used in the conversion reaction, and after carbonating with carbon dioxide, the mixed sodium carbonate and sodium arsenate is used to react on calcium arsenates. As the presence of a little sodium hydroxid or sodium plumite promotes the reaction of lead monoxide upon sodium arsenates, we prefer to leave a small quantity of sodium hydroxide uncarbonated. This precipitate is filtered, washed, and dried.

While we have described in detail the preferred practice of our process, it is to be understood that the details of procedure, and proportion of ingredients may be widely varied, and that known chemical equivalents may be employed in place of the materials mentioned without departing from the spirit of the invention or the scope of the subjoined claims.

We claim:

1. The method of oxidizing arsenious compounds to form arsenates which comprises treating said compounds with chlorine in the presence of a base capable of forming a soluble chlorid and a substantially insoluble arsenate, and then treating this substantially insoluble arsenate with a compound, the cation of which forms a more soluble metal arsenate or mixtures of more soluble arsenates and the anion of which combines with the base of the substantially insoluble arsenate to form a more insoluble compound.

2. The method of oxidizing arsenious compounds to form arsenates which comprises treating said compounds with chlorine in the presence of a base capable of forming a soluble chlorid and a substantially insoluble arsenate, and then treating this substantially insoluble arsenate with a compound, the cation of which forms a soluble alkali metal arsenate or mixture of soluble alkali metal arsenates and the anion of which combines with the base of the substantially insoluble arsenate to form a more insoluble compound.

3. The method of oxidizing arsenious compounds to form arsenates which comprises treating said compounds with chlorine in the presence of a base capable of forming a soluble chlorid and a substantially insoluble arsenate, and then treating this substantially insoluble arsenate with a compound, the cation of which forms sodium arsenate or mixtures of sodium arsenates and the anion of which combines with the base of the substantially insoluble arsenate to form a more insoluble compound.

4. The method of oxidizing arsenious compounds to form arsenates which comprises treating said compounds with chlorine in the presence of lime and then treating the calcium arsenate formed with a compound, the cation of which forms sodium arsenate, or mixture of sodium arsenates, and the anion of which combines with the calcium to form a more insoluble calcium compound.

5. The method of oxidizing arsenious compounds to form arsenates which comprises treating said compounds with chlorine in the presence of lime, separating the calcium arsenates from the calcium chlorid formed by filtration and then treating the calcium arsenate with a compound, the cation of which forms a more soluble metal arsenate or mixture of more soluble arsenates and the anion of which combines with the calcium to form a more insoluble calcium compound.

6. The method of oxidizing arsenious compounds to form arsenates which comprises treating said compounds with chlorine in the presence of lime, then separating the calcium arsenates from the calcium chlorid formed by filtration and then treating the calcium arsenates with sodium carbonate to form sodium arsenate or mixture of sodium arsenates and calcium carbonate, and filtering off the calcium carbonate.

7. The method of oxidizing arsenious compounds to form arsenates which comprises treating said compounds with chlorine in the presence of lime to form calcium chlorid and a substantially insoluble arsenate, then treating this substantially insoluble arsenate with a compound, the cation of which forms sodium arsenate or mixture of sodium arsenates, and the anion of which combines with the base of the substantially insoluble arsenate to form a more insoluble compound, and then treating the arsenates with an alkali metal hydroxid to form sodium tri-arsenate.

8. The method of oxidizing arsenious compounds to form arsenates which comprises treating said compounds with chlorine in the presence of lime to form calcium chlorid and a substantially insoluble arsenate, and then treating this substantially insoluble arsenate with a compound, the cation of which forms sodium arsenate or mixture of sodium arsenates and the anion of which combines with the base of the substantially insoluble arsenate to form a more insoluble compound, separating the sodium arsenates from the insoluble compound and adding a further quantity of sodium compound to the arsenates to form tri-arsenate.

In testimony whereof, we affix our signatures.

HARRY P. BASSETT.
ELBERT C. LATHROP.